United States Patent
Ekeroth et al.

(10) Patent No.: US 9,756,125 B2
(45) Date of Patent: Sep. 5, 2017

(54) CLIENT AND A SERVER AND METHODS THEREOF FOR DATA MANAGEMENT RELATING TO SHARED DATA STORAGE

(75) Inventors: Andreas Ekeroth, Luleå (SE); Vladimir Katardjiev, Uppsala (SE); Johan Kristiansson, Luleå (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 805 days.

(21) Appl. No.: 14/125,833

(22) PCT Filed: Jun. 16, 2011

(86) PCT No.: PCT/SE2011/050761
§ 371 (c)(1),
(2), (4) Date: Dec. 12, 2013

(87) PCT Pub. No.: WO2012/173541
PCT Pub. Date: Dec. 20, 2012

(65) Prior Publication Data
US 2014/0108516 A1 Apr. 17, 2014

(51) Int. Cl.
*H04L 29/08* (2006.01)
*G06F 11/16* (2006.01)
*G06F 11/20* (2006.01)

(52) U.S. Cl.
CPC ...... *H04L 67/1095* (2013.01); *G06F 11/1658* (2013.01); *G06F 11/2033* (2013.01); *G06F 11/2038* (2013.01)

(58) Field of Classification Search
CPC ............. H04L 67/1095; G06F 11/2033; G06F 11/2038; G06F 11/1658
See application file for complete search history.

(56) References Cited

U.S. PATENT DOCUMENTS

| 6,336,134 B1 | 1/2002 | Varma | |
| 2005/0055402 A1* | 3/2005 | Sato | G06F 17/30079 709/205 |
| 2009/0193104 A1* | 7/2009 | Gras | H04L 43/0817 709/223 |

(Continued)

OTHER PUBLICATIONS

Feng, et al., "Online Virtual Disk Migration with Performance Guarantees in a Shared Storage Environment," Parallel Computing Technologies; Lecture Notes in Computer Science vol. 3606; 2005, pp. 226-238.

(Continued)

*Primary Examiner* — Dustin Nguyen
*Assistant Examiner* — Juan C Turriate Gastulo
(74) *Attorney, Agent, or Firm* — Patent Portfolio Builders, PLLC (57) ABSTRACT

A distributed shared data storage such as the distributed shared memory exemplified with the DSM Master can seamlessly migrate (i.e. move) in the runtime between different nodes without affecting the user perceived performance according to embodiments of the present invention. This is achieved by using more than one replica simultaneously operating towards different master databases during the migration. That is, all distributed shared memory replicas can automatically and seamlessly be migrated to another master database, thus making the communication more flexible and efficient.

26 Claims, 8 Drawing Sheets

(56) References Cited

U.S. PATENT DOCUMENTS

| | | | |
|---|---|---|---|
| 2011/0296317 A1* | 12/2011 | Ishihara | G06F 17/2211 715/753 |
| 2012/0084775 A1* | 4/2012 | Lotlikar | G06F 9/45558 718/1 |
| 2012/0239616 A1* | 9/2012 | Cunningham | G06F 17/30578 707/620 |
| 2012/0278801 A1* | 11/2012 | Nelson | G06F 9/45533 718/1 |
| 2012/0297238 A1* | 11/2012 | Watson | G06F 11/3442 714/4.11 |
| 2012/0311603 A1* | 12/2012 | Kudo | G06F 3/0611 718/105 |

OTHER PUBLICATIONS

Hoshek, et al., "Data Management in an International Data Grid Project," Grid Computing—GRID 2000; Lecture Notes in Computer Science vol. 1971, 2000. pp. 77-90.

Chang, et al., "Adaptive Replicated Object with Cache Coherence in Distributed Shared Memory," Communications, 1999. APCC/OECC '99. Fifth Asia-Pacific Conference and Fourth Optoelectronics and Communications Conference. Oct. 18-22, 1999. pp. 1134-1138, vol. 2. Beijing, China.

Clark, et al., "Live Migration of Virtual Machines," USENIX Association, NSDI '05: 2nd Symposium on Networked Systems Design and Implementation. 2005. pp. 273-286.

* cited by examiner

CLIENT AND A SERVER AND METHODS THEREOF FOR DATA MANAGEMENT RELATING TO SHARED DATA STORAGE

TECHNICAL FIELD

The embodiments of the present invention relate to data management relating to shared data storage for implementation of collaborative software.

BACKGROUND

The Web is becoming more interactive than it has ever been before. It is now possible to implement synchronous video conferencing applications running in a web browser either using plug-ins or new HTML5 (Hyper Text Markup Language) APIs (Application Programming Interfaces) which will become widespread in a near future. Eventually, this will make it possible to implement cost effective and highly customized solutions for various vertical markets— for example e-health—rather than having to use a big, generic, one-size-fit-all horizontal solution.

While video and audio conferencing running in a web browser makes it possible to communicate in new ways, it essentially turns the browser into a synchronous communication platform. This also leads users to expect that other parts of the application to also be a part of the communication. For example, in an e-health application, users may want to share diagrams, pictures, sensor data, text documents or even run web applications together with the other peers in a conference session. A natural complement is, therefore, some kind of synchronization framework that allows the users to share the content of web applications with each other.

Figure 1:
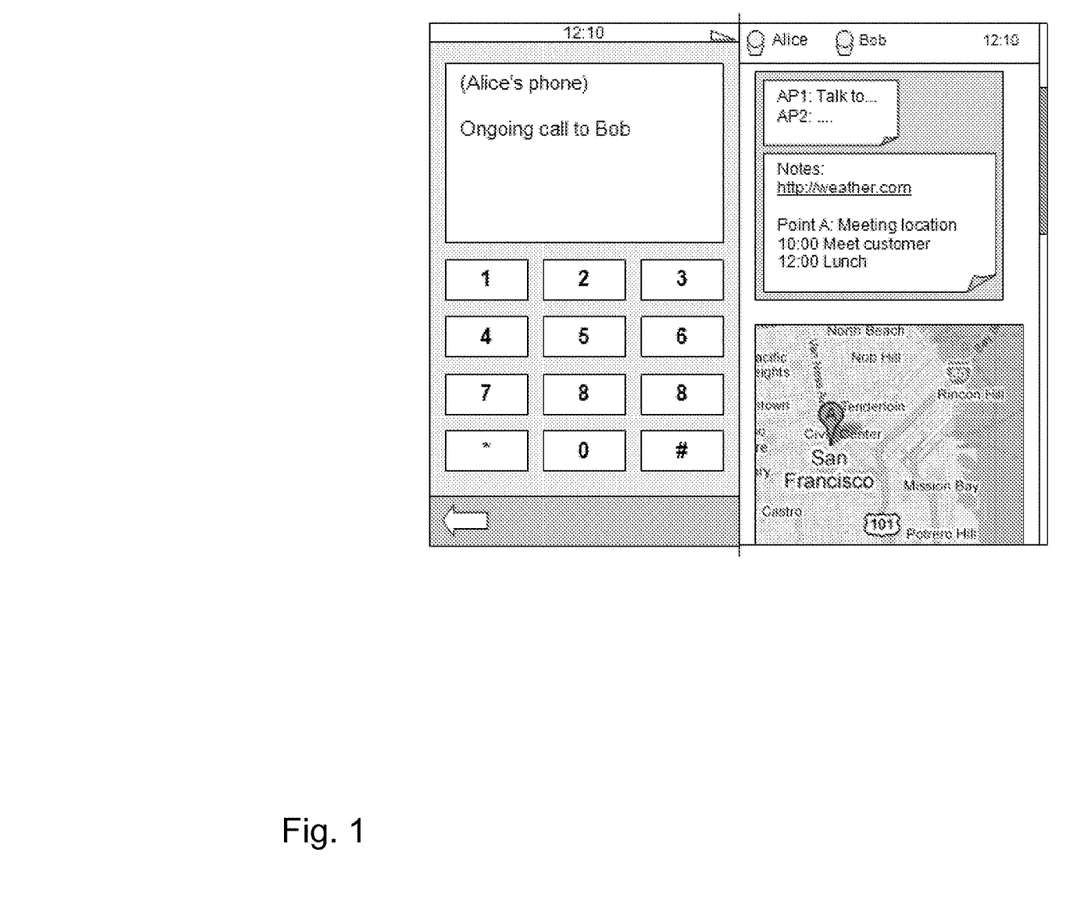
FIG. 1 illustrates a shared workspace added to a dialer application to allow the user to share web application during a phone call session according to prior art.

FIG. 1 illustrates a shared workspace added to a dialer application to allow the user to share a web application during a phone call session.

Distributed Shared Memory referred to as DSM available on Ericsson Labs makes it possible to synchronously share web application in real-time with other users. In short, a DSM is a distributed global addressable memory space where every memory space is assigned a unique address. By knowing this address, it is possible to get a copy or reference to that memory.

A DSM can be implemented in two ways. The first way is to provide a centralized solution where the DSM resides on an external server. The main drawback with this approach is that client must acquire a lock to the server before making any changes in order prevent the memory from becoming corrupted. A drawback with locks is that only one user at a time can update the memory and all other clients must wait until the first client has finished its operations, thus making it unsuitable for implementing synchronous collaborative services.

The second approach is to let each client acquire a local copy or replica of the DSM and then synchronize the DSM in the background. Any modification to a particular DSM is synchronized so that every replica converges to the same state after some time.

Operational Transformation (OT) is a theoretical framework for optimistic concurrency control allowing clients to work locally on a data set and then synchronize changes with other clients and servers in the background. Typically, Operational Transformation provides transformation functions that decide how to resolve merge conflicts that can occur if multiple users edit the same data set at the same time. The fundamental idea is to transform incoming operations (e.g. add, del, set etc.) done by other clients while taking into account previously executed operations so that the system converges to the same state while also preserving the intention of each operation.

Figure 2:
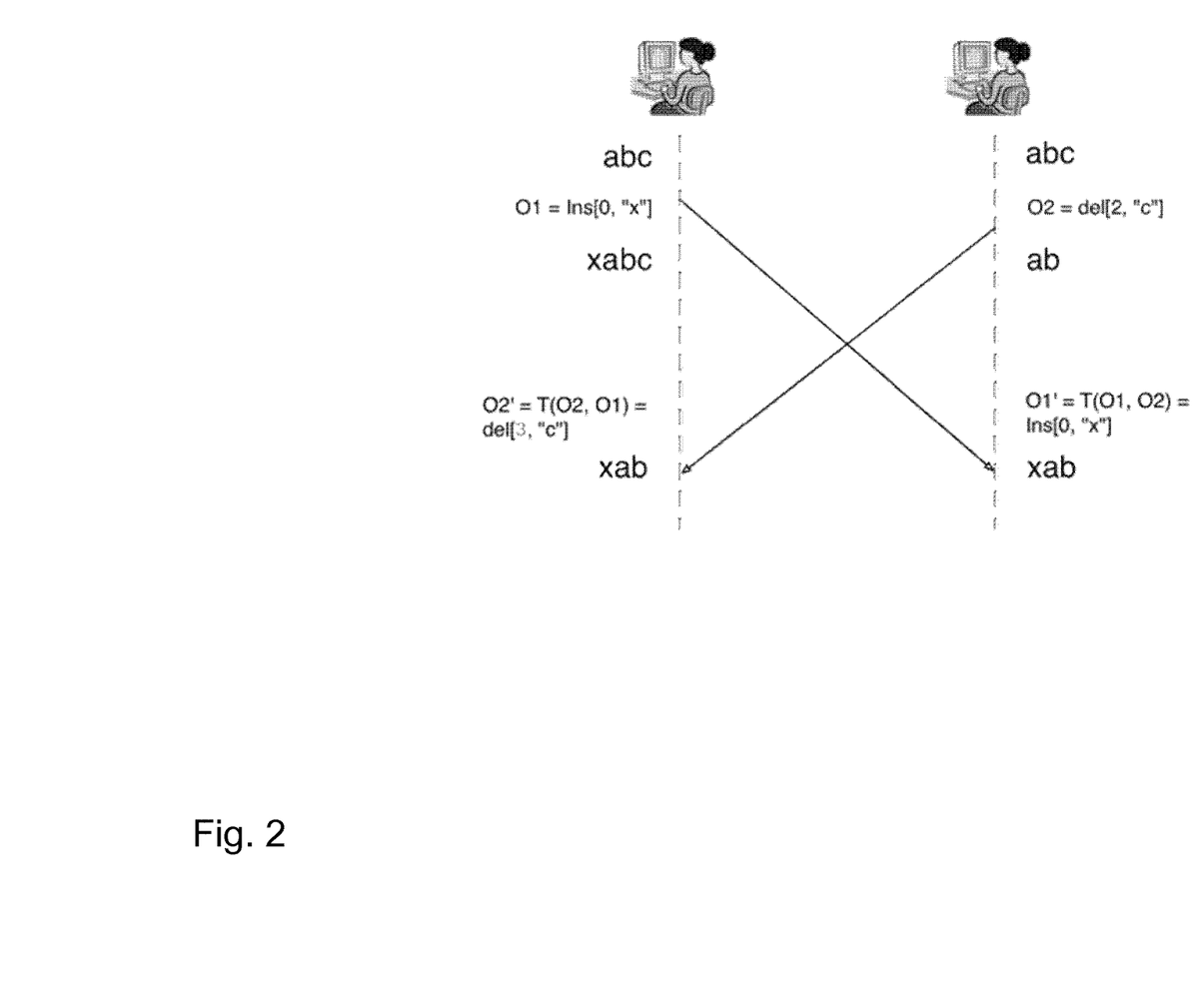
FIG. 2 illustrates an example where two users are editing a text document at the same time according to prior art.

FIG. 2 shows an example where two users are editing a text document at the same time. In the example, the text is initialized to "abc". The first user adds an "x" to the user's local document so that it becomes "xabc". At the same time, the second user deletes the third character (index 3) so that the document becomes "ab". They then forward the executed operations to each other. When the second user receives the operation done by first user it executes it, and the local document becomes "xab".

However, when the first user receives the operation done by the second user, a merge conflict occurs. Since the first user has added a character to the beginning of the document, applying the DEL(2) operation would delete the "b" and not the "c", which was not the intention of the second user. The solution to the merge conflict is to transform the DEL(2) operation so that it becomes DEL(3), due to the previously executed INS(0, X) operation.

Figure 3:
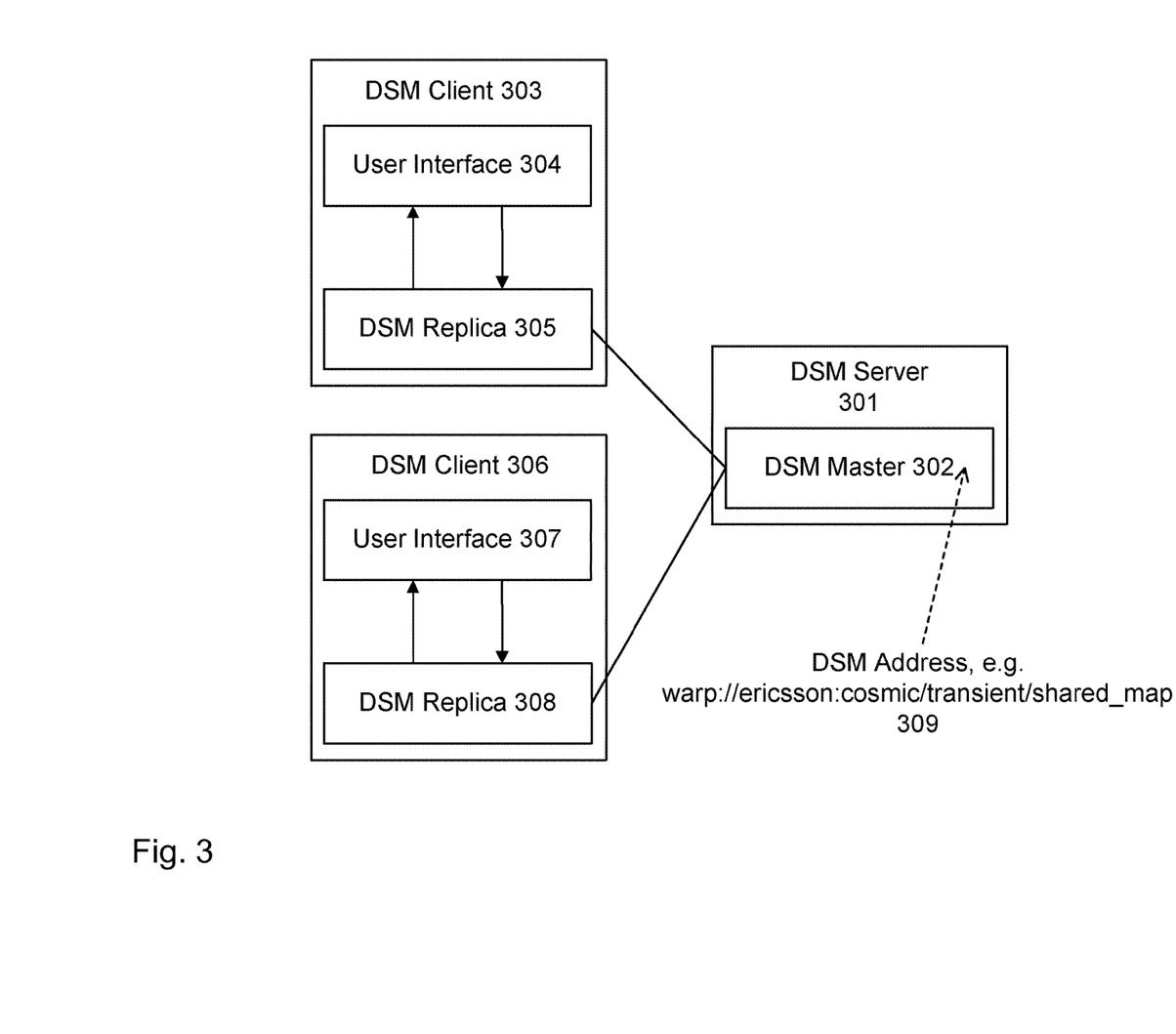
FIG. 3 illustrates the relationship between DSM Clients/Servers, DSM Master and DSM Replicas according to prior art.

A usage of Operational Transformation is to implement a distributed data storage such as a distributed shared memory or a distributed database where the OT server is viewed as master database and OT clients as replica clients. In the DSM framework, a local replica is referred to as a DSM Replica and the master database is referred to as DSM Master. Also, an application (for example the Shared Dialer Application) is using a DSM Replica 305, 308 via a user interface 304, 307 in a DSM Client 303, 306. A server 301 hosting a DSM Master 302 is referred to as a DSM Server. FIG. 3 depicts the relationship between DSM Clients 303, 306, DSM Servers 301, DSM Master 302 and DSM Replicas 305, 308. The DSM master 302 is identified by a DSM address 309

Any operation (get, add, delete and clear) done on a local DSM Replica is applied immediately without being delayed due to a server request or response. This makes it possible to implement responsive user interfaces without having to wait for lock on a central database.

OT resolves merge conflicts that occur if multiple applications update the same memory at the same time. In this way, each application can be completely unaware of each other. They just acquire a DSM Replica, which they then use to store and receive information without having to deal with synchronization issues or network signaling protocols to set up a session. Applications can also use a DSM Replica without it having to be fully initialized and replicated. In this case, any updates to the DSM are merged during the replication process.

The DSM framework creates DSM Master implicitly if they are requested by a DSM Client, i.e. there is no create function. Moreover, DSM Masters are automatically garbage collected if no DSM Clients are connected to them.

Web Connectivity[1] is an Ericsson API and server to provide an overlay network in the application layer, enabling applications running in any context to have a uniquely addressable URI, and act as a server. These URIs are uniform for the application, regardless of whether it runs on a server or client, native or browser. One application of this is to create, on the fly, servers in web applications, running in a browser. Once the session ends, and the user navigates away from the current page, the server is shut down and becomes inaccessible.

Web applications typically require that data is stored in a database running on a web server. This web server may run an internal corporative network, or intranet, which is not accessible from the Internet. Also, since some data may be too sensitive to be stored on a public web server, it becomes difficult to develop collaborative software where some parties reside on a public networks and some on private intranet.

For example, in a collaborative e-health application it may be beneficial for a nurse to share medical records stored on a hospital database with patients connected to networks in their homes. Sharing such domain specific information in a web application is difficult today due firewalls and corporate policies. It also makes it difficult to use the exiting DSM solutions as it is required that the DSM Master (or OT server) runs on a centralized server on a public network.

A solution to this problem would be to run a DSM Server in the end-user device (web browser/native app), for example running on the nurse's web browser client. However, to make the communication flexible it should be possible to transfer DSM Server to another Web browser client, for example if the nurse leaves and, instead, a doctor joins the conference.

The need for centralized web servers can also impose a scalability problem. While content delivery networks such as Akamai can be used to accelerate the performance for some web applications, it is hard to use such caching mechanisms to improve performance for stateful web services such as DSM, which is dependent on the Operational Transformation's client/server model. In this case, it could sometimes be beneficial to run a DSM Server in browser clients on end user devices in a peer-to-peer style. Still, it should be possible to address the DSM Server in a unified style using the same addressing schema, independent if it is running in the web browser/native app or on a dedicated server.

However, while a peer-to-peer solution would work for two users for example using a shared dialer telephony application, it may not be beneficial for multiparty conferencing. In this case, it would be useful if it were possible to seamlessly migrate data between different DSM Masters during a session to upgrade the application to better support conferencing. For example, if more than two clients connect to the DSM Master running in a web browser, the data is transferred to a DSM Server running on dedicated server hardware thus reducing the network load of the client. This migration process should be completely transparent and not affect the user perceived performance.

Being able to seamlessly migrate data to another DSM storage could also be used for load balancing purposes, for example if a DSM server becomes overloaded.

Another reason to be able to migrate data between different storages would be to support management of data centers where a hosted DSM Server can be seamlessly transferred to another DSM Server in runtime. This would be useful if a particular server needs to be rebooted or replaced. To reduce network delay it can also be useful to transfer a DSM session to another data center residing closer to the user. This is an important requirement to be able to develop telecom-grade services, and is particular important for implementing the aforementioned shared dialer application which is expected to always work.

beWeeVee is a commercial OT-based project which attempts to provide a peer-to-peer variant, in order to alleviate the need to host servers for all clients. In beWeeVee, every client is configured to act as a server, and can accept other clients. The OT algorithm employed ensures the entire system of servers, if properly configured, eventually arrives at a consistent state. A drawback of pure peer-to-peer solution is that the system becomes much more complex to implement in contrast of adopting a migratable OT client/server model as proposed in this invention.

Dynamic Clients, Dynamic Partitions, Locking and Migration capability for distributed server for real-time collaboration is shown in U.S. Pat. No. 6,336,134 B1. U.S. Pat. No. 6,336,134 B1 uses some kind of locking mechanism to partition a shared workspace among multiple server processes. Support for Operational Transformation and optimistic concurrency control is not discussed. Moreover, the solution of U.S. Pat. No. 6,336,134 B1 does not operate on top of an overlay network so it is not clear how to migrate a process to an end-user device such as web browser. The solution is based on history logging, which means that it will always be an interruption when switching data source.

SUMMARY

It is desired to achieve a solution where both clients and servers can seamlessly move between nodes connected to an overlay network while at the same time preserving data integrity and data consistency during a switchover/handover. In this way, a storage can exist anywhere and move to a more beneficial place at any time.

The proposed solution can be considered as an extension to the existing DSM framework. However in contrast to existing solutions, any node in the system, e.g. browsers and dedicated servers, can host a distributed shared data storage such as a shared memory or a shared database which in the DSM context corresponds to a DSM Master, which can be addressed using an unified addressing schema. The distributed shared data storage such as the distributed shared memory exemplified with the DSM Master can seamlessly migrate (i.e. move) in the runtime between different nodes without affecting the user perceived performance. That is, all distributed shared memory replicas can automatically and seamlessly be migrated to another DSM Master, thus making the communication more flexible and efficient.

According to a first aspect of embodiments of the present invention, a method in a client for seamlessly migrating a shared data storage from a first node to a second node is provided. In this way the shared data storage is accessible to clients accessing the shared data storage during and after the migration. The client comprises a first replica of the shared data storage associated with the first node to be used for operations on the shared data storage. In the method, a migration manager in the client configures a second replica of the shared data storage associated with the second node, and the first and the second replicas to be used for operations simultaneously during the migration from the first and the second node. Further, the migration manager receives information that the shared data storage associated with the first node is synchronized with the shared data storage associated with the second node. Based on the received information, the migration manager configures the first and the second replicas such that only the second replica is used for operations on the shared data storage.

1. According to a second aspect of embodiments of the present invention a method in a second node for seamlessly migrating a shared data storage from a first node to the second node is provided, such that the shared data storage is accessible to clients during and after the migration. In the method, a migration manager configures a first proxy replica of the shared data storage associated with the first node, a second proxy replica of the shared data storage associated with the second node, and a synchronization of the first and the second proxy replicas. Further, the migration manager updates a lookup table replica maintained by said migration manager with information that a shared data storage associated with the second node can be used in addition to the shared data storage associated with the first node, wherein the lookup table replica is associated with a lookup table master which in turn is associated with lookup table replicas of other nodes and clients.

According to a third aspect of embodiments of the present invention, a client for seamlessly migrating a shared data storage from a first node to a second node is provided, such that the shared data storage is accessible to clients accessing the shared data storage during and after the migration. The client comprises a first replica of the shared data storage associated with the first node to be used for operations on the shared data storage. The client comprises a migration manager adapted to configure a second replica of the shared data storage associated with the second node, to configure the first and the second replicas to be used for operations simultaneously during the migration from the first and the second node, to receive information that the shared data storage associated with the first node is synchronized with the shared data storage associated with the second node, and to configure the first and the second replicas such that only the second replica is used for operations on the shared data storage.

According to a fourth aspect of embodiments of the present invention a second node for seamlessly migrating a shared data storage from a first node to the second node is provided, such that the shared data storage is accessible to clients during and after the migration. The second node comprises a migration manager adapted to configure a first proxy replica of the shared data storage associated with the first node, to configure a second proxy replica of the shared data storage associated with the second node, to configure a synchronization of the first and the second proxy replicas, and to update a lookup table replica maintained by said migration manager with information that a shared data storage associated with the second node can be used in addition to the shared data storage associated with the first node. Further, the lookup table replica is configured to be associated with a lookup table master which in turn is configured to be associated with lookup table replicas of other nodes and clients.

An advantage with embodiments of the present invention is that it is possible to run DSM Masters in a browser or native application in a peer-to-peer style which reduces the need to invest in a costly infrastructure. While a peer-to-peer solution has limitations (e.g. users may leave, hard to handle persistent data), embodiments of the present invention make it possible to easily switch between a peer-to-peer solution (i.e. DSM Master hosted on client) and a centralized solution.

A further advantage with the embodiments is that it becomes possible to share domain specific information by hosting a DSM Master in web browser of one of the users, e.g. a doctor, and then seamlessly migrate the DSM to another participant to another DSM Master if required. For example, migrate a DSM Master to another doctor or nurse if the first doctor disconnects.

A yet further advantage is that the embodiments make it possible to host DSM Master in one peer (e.g. browser/web runtime) between two users and then upgrade the application to group conference by seamlessly moving the DSM Master to a dedicated server. Migrating to a dedicated server can also be useful to save data persistently which may become lost if e.g. a web browser is closed.

A yet further advantage with the embodiments is that it becomes possible to move (i.e. migrate) a hosted DSM Master to another DSM Master in case a DSM Server needs to be restarted, upgraded, or otherwise taken offline. Hence, it becomes possible to offload a DSM Server by seamlessly migrating clients to another DSM Server and it becomes possible to use multiple DSM Masters at the same time, which makes the system more robust in case a particular DSM Server fails. Furthermore, it becomes possible to migrate a DSM Master to another DSM Master running on a DSM Server closer to the user from a network topological point of view, which may reduce network delay.

DETAILED DESCRIPTION

The embodiments of the present invention relate to distributed shared data storages such as distributed shared databases or distributed shared memories and are applicable to the concept described as Distributed Shared Memory (DSM). Although the embodiments are described in the context of DSM, the embodiments of the present invention are not limited to DSM, they can also be applicable to other types of shared memory mechanisms or implementation of distributed databases.

Figure 4:
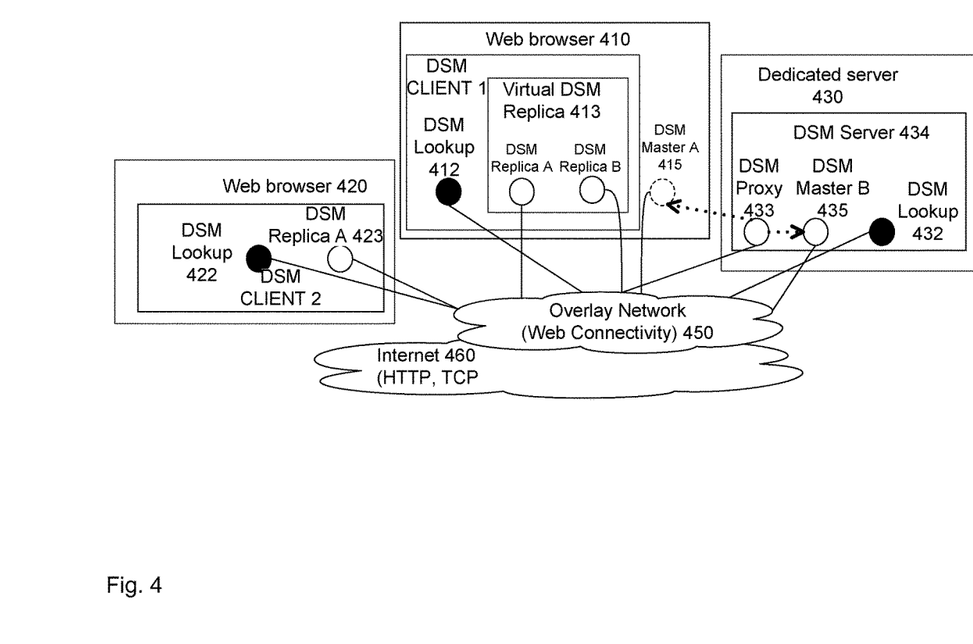
FIG. 4 illustrates a system wherein embodiments of the present invention can be implemented.

FIG. 4 shows an overview of a system according to embodiments of the present invention where a DSM Master A is used by DSM clients 1 and 2.

DSM client 1 is hosted by a web browser 410, wherein the web browser 410 also hosts the DSM Master A 415. DSM client 2 is hosted by another web browser 420 and the DSM client 2 comprises a DSM replica A 423 and DSM lookup 422. The DSM Master A 415 is running in the web browser 410 of a client 1 and the data storage of DSM Master A is going to be migrated to another DSM Master 435 with address B hosted by a DSM Server 434 running on dedicated server hardware 430.

The DSM Lookup tables 412, 422, 432 are used to redirect and resolve DSM addresses as well notify connected DSM Clients, e.g. client 2, if a data storage is migrated to another DSM Master. All involved DSM clients and DSM Servers comprise a respective DSM lookup table, which all are DSM replicas of a DSM Master lookup table such that all DSM lookup tables can be maintained updated. The DSM server 434 comprises a migration manager (not shown) which is configured to configure DSM proxy replicas A and B (denoted DSM proxy 433). It should be noted that the individual DSM proxy replicas are not illustrated in FIG. 4. A DSM proxy replica A is associated with the DSM Master A 415 and a DSM proxy replica B is associated with DSM Master B 435. The DSM proxy replicas A and B are used to synchronize the DSM Master A 415 with the DSM Master B 435 so that is becomes possible to use multiple DSM Masters at the same time.

The DSM client 1 implemented in a web browser 410 comprises a migration manager (not shown) which is adapted to configure replicas A and B comprised in a virtual DSM replica 413. The DSM replica A is associated with the DSM Master A 415 and the DSM replica B is associated with DSM Master B 435. The virtual DSM replica 413 allows DSM clients to seamlessly switch between the two or more DSM Masters since both DSM replicas are used simultaneously. Hence, during a migration of a data storage from e.g. DSM Master A 415 to DSM Master B 435 all operations are done on both DSM replica A and on the DSM replica B of the virtual DSM replica 413 while allowing an application of the web browser 410 interfacing only one interface, i.e. the virtual DSM replica 413. Using the two DSM Replicas at the same time ensures that the user perceived performance is not affected during the migration process.

The DSM clients 1 and 2 and the DSM server 434 are connected via an overlay network 450 having web connectivity functionality. The overlay network is located on top of the Internet 460 using Hyper Text Transfer Protocol (HTTP) and Transmission Control Protocol (TCP).

In the following, different terms used throughout the specification will be explained. It should be noted that although the terms are explained in the context of DSM, the embodiments are not limited to DSM but can be used in other distributed shared data storage applications: A shared data storage such as a shared memory and a shared database is exemplified by DSM Masters which are databases containing a respective DSM Storage as well as a respective functionality to receive messages from a network where the messages contain instructions how to manipulate the DSM Storage. These instructions are called operations. A DSM Master also contains an OT algorithm or a similar algorithm to transform incoming operations and forward them to connected DSM Replicas. The DSM Master is identified by unique address called a DSM address. Hence, the DSM Master is migrated from one address to another.

A DSM Storage is a physical place in a computer memory or disk drive where data is stored. It can be a key-value store, also known as a hash map or hash table, where both key and values are stored and where the key is used to look up the value. It can also be an ordered array/list of values where an index points out a particular value.

A DSM Server hosts one or several DSM Masters. It can either run on a dedicated server running in a data center or run on the end-users device, e.g. a web browser.

A DSM Client hosts one or several DSM replicas. It contains functionality to request a DSM replica from a DSM master identified by the unique DSM address. A DSM Client is typically running on a web browser or a native application runtime environment such as Android.

A DSM Replica is a copy of a particular DSM Master, and is used by applications to implement collaborative features. All operations add, set, del etc. are always done on the DMS Replica. When the operations are applied on the DSM Storage, the locally committed operations are then sent to a DSM Master which transforms the received operations and forwards them to other connected DSM Replicas. The DSM replicas also contain an OT algorithm or similar algorithm to transform incoming operations in case the DSM Replica has changed state due to a locally committed operation. Similar to the DSM Master, the DSM Replica also operates on top of a DSM Storage.

In the DSM server, to which the shared data storage should be migrated, the DSM replicas running in the DSM server are referred to as DSM Proxy Replicas. Each DSM Proxy Replica is a copy of a respective DSM Master. Data is copied between the DSM proxy replicas so that two or more DSM Masters become synchronized. The configuration of the DSM proxy replicas are performed by a Migration Manager. Furthermore, this copy procedure is also done by the migration manager.

In the DSM Client the DSM replicas are associated with a virtual DSM Replica. A migration manager in the DSM client configures the Virtual DSM replica and its DSM replicas. Each DSM replica is a copy of a respective DSM Master. The purpose of the Virtual DSM Replica is to provide an abstraction layer, i.e. add a level of indirection so that a migration to another DSM Master is transparent to applications. In contrast to a DSM Proxy Replica, data between the internal DSM replicas are not copied.

The migration manager runs in both in DSM servers and DSM clients. If it runs in a DSM Client it is responsible for communicating with remote migration managers running on DSM Servers to initiate a migration to another DSM Master. It is also responsible for configuring the virtual DSM replicas. Every Migration Manager has a copy of special DSM Replica known as DSM Lookup Table. The Lookup Table is used to redirect a particular address to another DSM Master. It contains mapping between DSM Addresses. Migration Managers running on DSM Servers are responsible for configuring DSM Proxy Replicas. It is also responsible for updating the DSM Lookup Table to trigger a migration to another DSM Master.

The original DSM Lookup Table is in fact a DSM Master itself, which all Migration Managers has a replica of. This means that all migration managers immediately receive an update when a shared data storage with a first DSM Address has been migrated to another address (i.e. another DSM Master). The DSM Lookup Table contains a DSM Storage configured as a key-value storage where the key is an address to a (old) DSM Master and the value to another (new) DSM Master.

Figure 5:
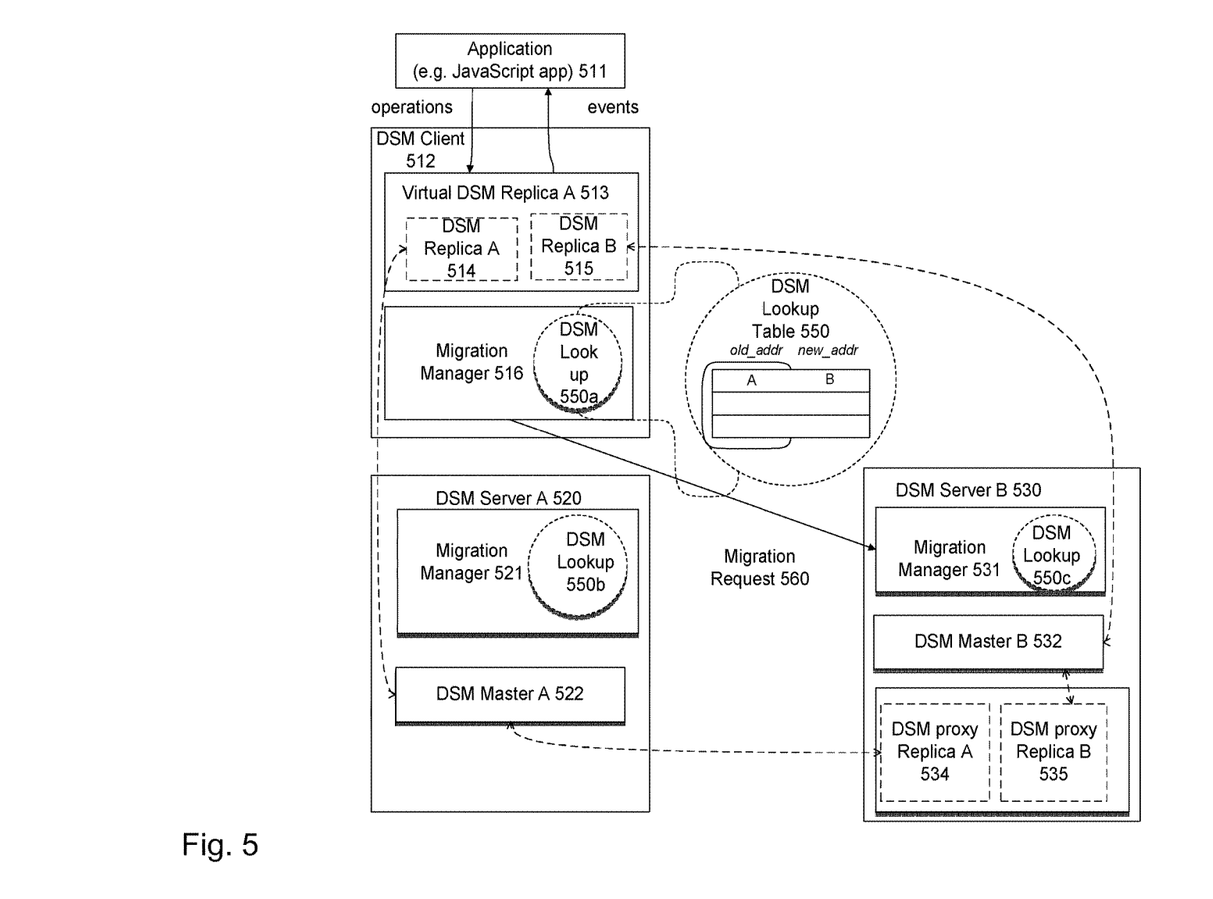
FIG. 5 exemplifies a migration of a DSM Master from one server to another according to embodiments of the present invention.

FIG. 5 exemplifies a procedure to migrate a shared data storage exemplified by a DSM operated by DSM Master A 522 to DSM Master B 532. I.e., the DSM Master is to be migrated from address A to address B. OT can be used when multiple applications via DSM clients 512 start interacting using a shared data storage.

An application 511 of a web browser of a user device uses a shared memory, DSM Master A 522 via a DSM replica 514 on a DSM client 512 also implemented on the user device. The DSM client 512 comprises a Migration Manager 516 and a Virtual DSM Replica 513 further comprising DSM Replicas A 514 and B 515. The application 511 operates on the distributed shared memory 522 via the virtual DSM replica 513. Although, the Virtual DSM replica 513 comprises a DSM replica A 514 associated with a DSM master A in a DSM server A and the DSM replica B 515 associated with the DSM master B 532 in a DSM server B 530, the application only operates on the shared memory via a single interface, i.e. the virtual DSM replica 513. Moreover, the client comprises a Migration Manager 516 controlling the migration, the configuration of the virtual DSM replica 513 and the migration manager 516 comprises a DSM Lookup table 550a which is a replica of a DSM master lookup table 550.

The DSM master A 522 is located in a DSM server 520. The DSM server also comprises a migration manager 521 further comprising a DSM lookup 550*b*, which is a replica of a DSM master lookup table 550. The DSM server A can be running on dedicated server hardware.

The DSM server B 530 comprises a migration manager 531, the DSM master B 532 and DSM proxy replicas 534,535. The migration manager 531 is configured to exchange information with the migration manager of the DSM client 516 and of the DSM Server A 521. The DSM Proxy Replica A 534 is associated with the DSM Master A 522 in the DSM server A 520 and another DSM proxy replica 535 is associated with the DSM master B 532 in the DSM server B 530. The migration manager 531 is configured to synchronize the DSM proxy replicas 534, 535 which results in that the DSM master A 522 and the DSM master B 532 maintains synchronized. Moreover, the migration manager 531 is configured to control the migration and the migration manager 531 comprises a DSM lookup 550*c* which is a replica of a DSM master lookup table 550.

In the example of FIG. 5, the DSM Client 512 decides to switch from DSM master A 522 to DSM master B 532, but the migration can also be triggered by a DSM Server, for example if it becomes overloaded.

To perform the migration, the first step is to send a message 560 to the Migration Manager 531 of DSM Master B requesting a migration from DSM Master A to DSM Master B. Another possibility would be to send the message to the migration manager 521 of DSM Master A and let it forward the message to the migration manager 531 of DSM Master B. In the DSM Client 512, the migration request is triggered by the migration manager 516.

When the migration request message 560 has been sent, the Migration Manager 516 of the DSM client 512 configures the Virtual DSM Replica 513 to start using DSM Replica B 515 in addition to DSM Replica A 514. When DSM Replica A 514 and DSM Replica B 515 contain the same information i.e. they reach the same state, the migration manager 516 configures the Virtual DSM Replica 513 to start using only DSM Replica B 515. This will not happen until DSM Master B 532 has been synchronized with DSM Master A 522.

When only DSM Replica B 515 is being used, the Migration Manager 516 disconnects DSM Replica A 514. Hence, the DSM Master A 522 will automatically be garbage collected when all DSM Replicas has disconnected.

In the following text the synchronization procedure is further described.

When Migration Manager 531 of DSM server B 530 receives the migration request message 560, the migration manager 531 is configured to create two DSM Proxy Clients where DSM Proxy Replica A 534 is connected to DSM Master A and DSM Proxy Replica B 535 is connected to DSM Master B 532. Algorithm 1 is an example of how a synchronization of two DSM masters can be performed. Algorithm 1 is to be implemented in the DSM server to which the DSM Master should be migrated.

Algorithm 1 - Synchronizing two DSM Masters

```
dsmReplicaA.onReady do
    dsmReplicaA.forEach v do # where v is either a index or key
        dsmReplicaB.set v, dsmReplicaA.get(v)
    end
    dsmReplicaA.onUpdate operation do
        dsmReplicaB.execute operation
```

Algorithm 1 - Synchronizing two DSM Masters

```
    end
end
dsmReplicaB.onReady do
    dsmReplicaB.forEach v do A # where v is either a index or key
        dsmReplicaA.set v, dsmReplicaB.get(v)
    end
    dsmReplicaB.onUpdate operation do
        dsmReplicaA.execute operation
    end
end
```

Algorithm 1 shows a pseudo code for synchronizing DSM Master A 522 and DSM Master B 532. When DSM Proxy Replica A 534 becomes replicated (on Ready) it will copy all stored values to DSM Proxy Replica B 535. Also, when DSM Proxy Replica A 534 gets an update, i.e. receive an operation done by a remote client or DSM Proxy Replica B 535, it will copy the data to DSM Proxy Replica B 535. The same procedure is done by DSM Proxy Replica B.

Note that typically DSM Proxy Replica B 535 (assuming a migration from DSM Master A to DSM Master B) will be empty as it is created right after migration processed has been triggered, which means that no data needs to be copied when it is replicated during the first initializing phase. Also note that the same algorithm can be extended to synchronize more than two DSM Masters.

When synchronizing DSM Master A 522 and DSM Master B 532, it is of highest importance that the two databases converges to the same state, i.e. they will eventually gets the same content. It is also important that the intention of the operation is preserved. For example, if a client adds a character in the beginning of a shared string, that character should not be added to the end of the shared string although that would fulfill the converge requirement.

Figure 6:
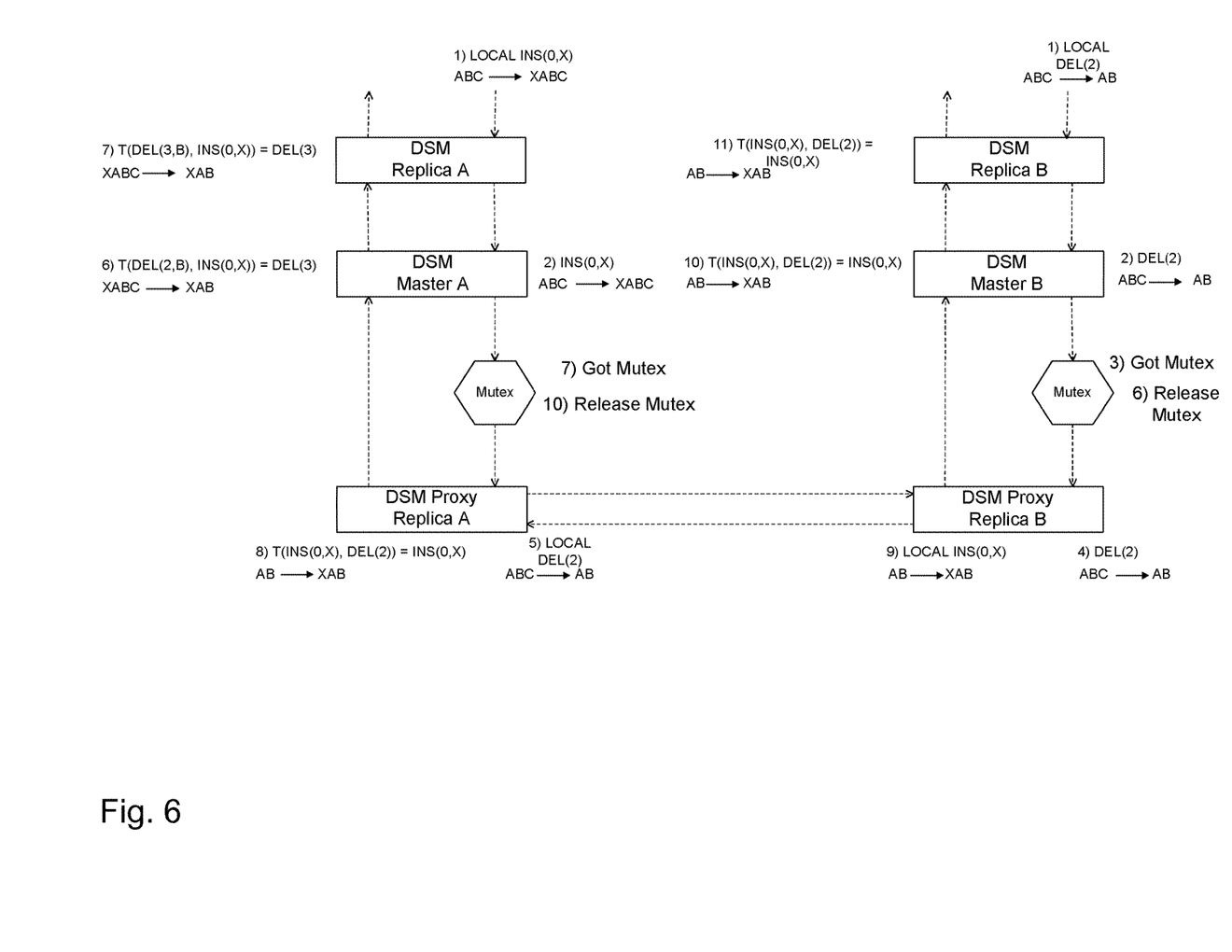
FIG. 6 illustrates how a mutex is used to ensure convergence and intension preservation requirements.

FIG. 6 illustrates how a mutex (mutual exclusion) is used to ensure convergence and intension preservation requirements. The mutex is a lock to prevent concurrently running code to access the same memory area at the same time. Further, FIG. 6 shows an example of two clients editing the same string at the same time. It is similar to the example shown in FIG. 2, but client 1 is using DSM Master A and client 2 is using DSM Master B; these are connected using a respective DSM Proxy Replica. In this scenario, it may be desired to migrate from DSM Master A to DSM Master B, i.e. the client 1 is to migrate from DSM Master A to DSM Master B. The clients in this example comprise the corresponding functionality as the DSM client of FIG. 5.

Client 1 adds an X to the string so that it becomes "XABC". At the same time, Client 2 removes the "C" so that the string becomes "AB". They will then send the operation to their respective DSM Master, which will transform the operation if necessary and store its local storage. For example, after receiving the INS(0,X) operation, DSM Master A will also contain the string "XABC".

Operations as exemplified above will be forwarded by the DSM Master to the DSM Proxy Replica A 534, which is also connected to DSM Master A 522. Similarly, DSM Master B 535 will forward its received operation to the DSM Proxy Replica B 535, which will transform the operation and apply it locally.

However, if both DSM Replica Proxy A 534 and DSM Replica Proxy B 535 apply the operation at the same time, it will not be possible copy the values as described in Algorithm 1 as the DSM Proxy Replica A 534 and DSM Proxy Replica B 535 have diverged to different states. For example, in that case DSM Replica Proxy A 534 would contain the string "XABC" and DSM Proxy Replica B 535 would contain the string "AB". This means that it not possible for DSM Replica Proxy B 535 to apply a DEL(2) operation on DSM Replica Proxy A as that would delete the wrong character (the "B" character), thus violating the intention preservation requirement.

The solution to the aforementioned problem is to prevent DSM Replica A 534 and DSM Replica B 535 to diverge more than one state ahead. Before a DSM Replica Proxy A 534 or DSM Replica B 535 can process any incoming operation they need to acquire a lock via a shared Mutex. Only the DSM Replica that has granted access to the Mutex and proceed and the other one must wait. In the example depicted in FIG. 6, DSM Replica Proxy B got the mutex and can thus process the DEL(2) operation and then apply it on DSM Replica Proxy A, which is waiting and has not yet updated its state to "XABC". Another possibility to implement locking would be to implement token principle where only the client having the token can proceed.

Note that this locking mechanism will not affect the non-blocking feature of OT in general as it will only affect the two DSM Proxy Replicas. Also, note that the Mutex mechanism can easily be implemented as both DSM Proxy Replica A and DSM Proxy Replica B run in the same logical process, for example on the same server.

When DSM Master B has successfully created the DSM Proxy Replica A and secured that algorithm 1 is running, it will update DSM Lookup table. Then the DSM clients can choose which DSM replica of the virtual DSM replica it wants to use. The synchronization will continue as long as the DSM replicas are operating towards more than one DSM master.

The DSM Lookup table is implemented as a special DSM, which all clients are expected to have replica of. The DSM master of the lookup table is located on a DSM server running somewhere in the network. This means that all clients connected to the distributed shared memory system receives events via the DSM replicas of the DSM lookup table when a DSM client has been redirected to another DSM Master.

Address resolution is managed by the Migration Manager of the DSM client. The Migration Manager of the DSM client will also resolve DSM addresses when its DSM Client is first set up to make sure that the correct DSM Master is replicated.

---
Algorithm 2 - Resolving DSM addresses
---

```
lookupTable.onUpdate operation do
    address = operation.key
    # check my address has been redirect to yet another DSM Master
    if address == myAddress
        newAddress = address
        do
        resolvedAddress = newAddress
        newAddress = dolookupTable.get newAddress
        while newAddress!=nil
            # now set up a DSM Replica using resolvedAddress
        end
    end
```

---

Algorithm 2 shows a procedure needed to resolve a DSM address. Note that DSM resolution is done iteratively or recursively if the DSM address has been redirected multiple times.

Also, note that it is possible to apply the same mechanism as described in this document to replica the DSM Lookup so that it can run on multiple DSM Servers or migrate it to another DSM Master.

A DSM Replica can detect for example by receiving a disconnect event from the transport layer or detecting that the DSM Master is not responding when a DSM Master has failed and is not working correctly. It then notifies the migration manager which creates a DSM Master locally and also a corresponding DSM Replica. It then copies all values stored in broken DSM Replica to the new DSM Replica. Finally, it updates the DSM Lookup table to redirect the broken DSM address to the new DSM Master.

The aforementioned procedure is done by all DSM clients, which will lead to merge conflict on the DSM Lookup as multiple clients tries to update the same lookup entry at the same time. However, as the DSM Lookup is also implemented as a DSM Replica/Master entity, this conflict will be resolved accordingly and all DSM clients will be notified about the correct (winning) DSM Master. In other words, every DSM Client competes to become a new DSM Master if the currently used DSM Master fails. This competition will result in a merge conflict which will ultimately be resolved using Operational Transformation.

Figure 7:
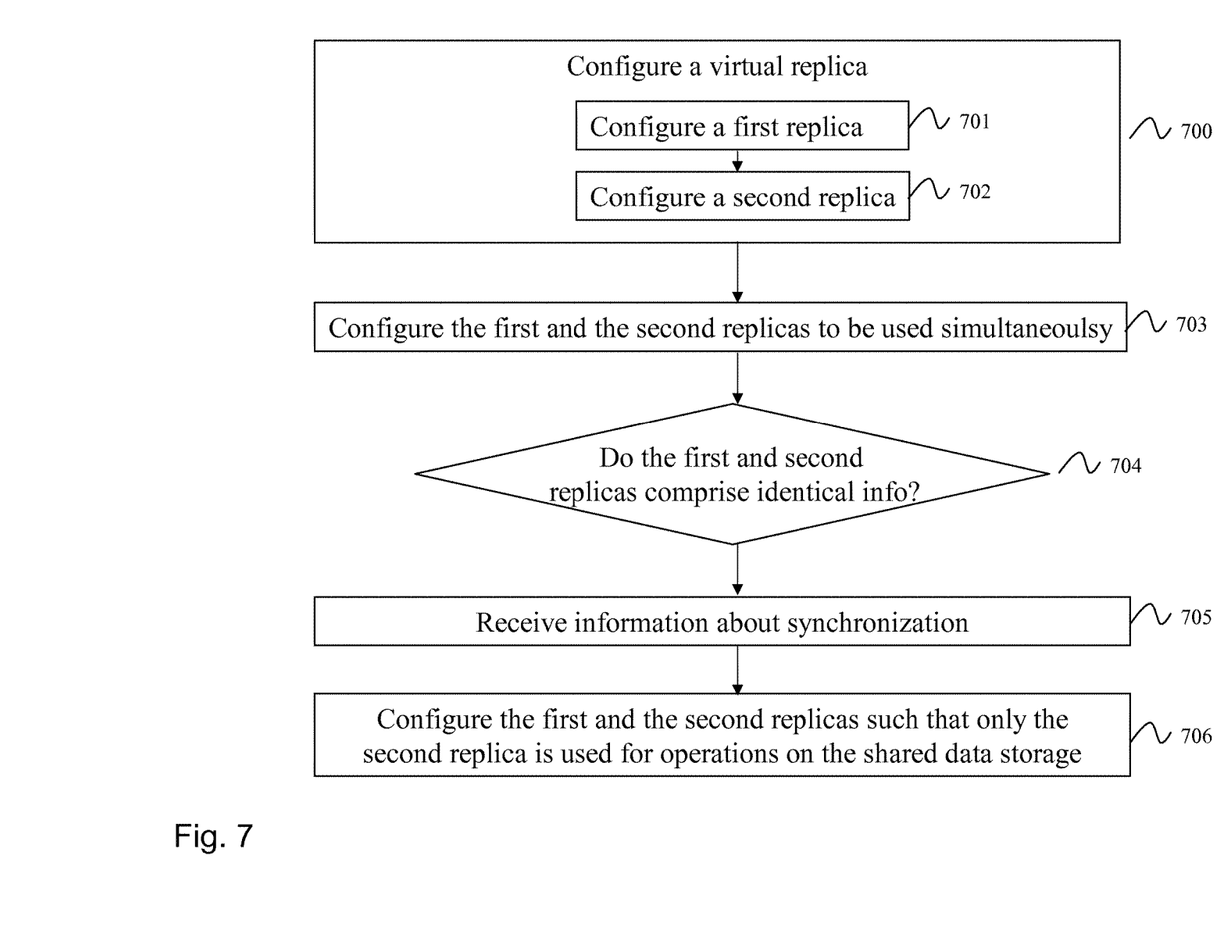
FIGS. 7 and 8 are flowcharts of the method according to embodiments of the present invention.

As illustrated in the flowchart of FIG. 7, a method in a client for seamlessly migrating a shared data storage from a first node to a second node is provided. In this way, the shared data storage is accessible to clients accessing the shared data storage during and after the migration.

The method comprise configuring 700 a virtual replica encapsulating a first and a second replica internally to provide a single interface towards applications operating on the shared data storage. Hence, the client comprises a first replica of the shared data storage associated with the first node to be used for operations on the shared data storage. A migration manager is configuring 701, 702 the first replica and a second replica of the shared data storage associated with the second node. In a further step the first and the second replicas are configured 703 to be used for operations simultaneously during the migration from the first and the second node. If the first and second replicas comprises identical information 704, information that the shared data storage associated with the first node is synchronized with the shared data storage associated with the second node is received 705. Accordingly, the received information at said migration manager that the shared data storage associated with the first node is synchronized with the shared data storage associated with the second node comprises information that the first and second replicas comprise identical information.

Based on the received information, the first and the second replicas are configured 706 such that only the second replica is used for operations on the shared data storage. Furthermore according to an embodiment, each node is identified by an address and the migration manager maintains a lookup table replica mapping the addresses of the first node with the second node so that each client having a lookup table replica can be notified when a lookup table replica is modified, wherein each lookup table replica is associated with a lookup table master.

According to a further embodiment, merge conflicts on the shared data storage are resolved using Operational Transformations. Also, the migration may be triggered based on the load of the first node in order to achieve load balancing.

Figure 8:
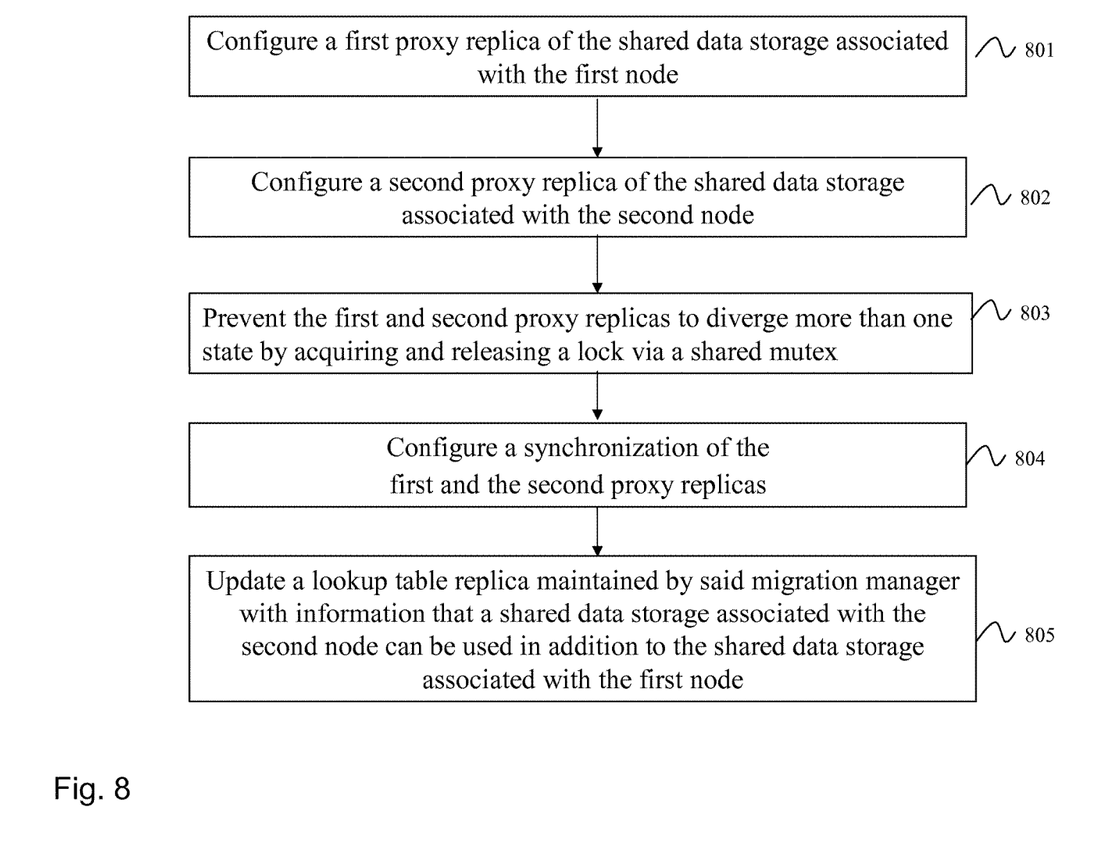

As illustrated in the flowchart of FIG. 8, a method in a second node for seamlessly migrating a shared data storage from a first node to the second node, such that the shared data storage is accessible to clients during and after the migration. The second node is exemplified by the DSM Server B in FIG. 5.

The method comprises configuring 801 by a migration manager in the second node a first proxy replica of the shared data storage associated with the first node, and configuring 802 by a migration manager in the second node a second proxy replica of the shared data storage associated with the second node.

According to an embodiment, the first and second proxy replicas are prevented 803 to diverge more than one state by acquiring and releasing a lock via a shared mutex for each incoming operation where only the proxy replica client that has acquired the mutex can process incoming operations.

The method comprises the further step of configuring 804 by said migration manager a synchronization of the first and the second proxy replicas, and updating 805 a lookup table replica maintained by said migration manager with information that a shared data storage associated with the second node can be used in addition to the shared data storage associated with the first node. The lookup table replica is associated with a lookup table master which in turn is associated with lookup table replicas of other nodes and clients.

The second node and the first node can be web browser, native application runtime environment or dedicated server.

As illustrated in FIG. 5, a client 512 for seamlessly migrating a shared data storage from a first node 520 to a second node 530 is provided. Hence the shared data storage is accessible to clients accessing the shared data storage during and after the migration. The client 512 comprises a first replica 514 of the shared data storage associated with the first node 520 to be used for operations on the shared data storage. The client 512 comprises further a migration manager 516 adapted to configure a second replica 515 of the shared data storage associated with the second node 530, to configure the first 514 and the second replicas 515 to be used for operations simultaneously during the migration from the first 520 and the second node 530 and to receive information that the shared data storage associated with the first node 520 is synchronized with the shared data storage associated with the second node 530, and to configure the first 514 and the second 515 replicas such that only the second replica 515 is used for operations on the shared data storage.

According to an embodiment, the client comprises a virtual replica 513 encapsulating the first 514 and second 515 replicas internally to provide a single interface towards applications operating on the shared data storage.

In addition, the migration manager 516 may be configured to maintain a lookup table replica 550a mapping the addresses of the first node 520 with the second node 530 so that each client having a lookup table replica can be notified when a lookup table replica is modified, wherein each lookup table replica is configured to be associated with a lookup table master 550.

According to a further embodiment, the migration manager 516 is configured to trigger a migration based on the load of the first node.

Moreover, a second node 530 for seamlessly migrating a shared data storage from a first node to the second node is provided with reference to FIG. 5. The second node 530 comprises a migration manager 531 adapted to configure a first proxy replica 534 of the shared data storage associated with the first node 520, to configure a second proxy replica 535 of the shared data storage associated with the second node 530, to configure a synchronization of the first 534 and the second 535 proxy replicas, and to update a lookup table replica 550c. The lookup table replica 550c is maintained by said migration manager with information that a shared data storage associated with the second node 530 can be used in addition to the shared data storage associated with the first node 520, wherein the lookup table replica 550c is configured to be associated with a lookup table master which in turn is configured to be associated with lookup table replicas 550 of other nodes and clients.

The migration manager 531 is according to an embodiment is configured to control a lookup table replica mapping the addresses of the first node 520 with the second node 530 so that each client can be notified via a respective lookup table replica when the lookup table replica 550c of the migration manager 531 of the second node is updated.

As mentioned above, the second node 530 may be configured to resolve merge conflicts on the shared data storage using Operational Transformations.

In accordance with a further embodiment, the second node 530 is configured to prevent the first 534 and second 535 proxy replicas to diverge more than one state by acquiring and releasing a lock via a shared mutex for each incoming operation where only the proxy replica client that has acquired the mutex can process incoming operations.

The second node can be a web browser, native application runtime environment or a server.

The embodiments of the present invention are applicable e.g. in e-health applications. An example of such an application is described below. Alice is feeling is worried about a skin rash on her youngest child. Instead of using regular telephony, she uses a health care app on her mobile used device. The e-health app is bundled with a collaborative workspace that patients and doctors can use to share media and data as well as run web application together, thus allowing them to experience a much richer communication than just plain voice.

She calls to the health center by starting the e-health app and gets connected to a nurse, which answers the call using her smart phone device. Alice takes a photo of the rash using her mobile phone. By using a drag-and-drop interface she drags the picture into the collaborative workspace thus transforming the picture into a collaborative web widget. This sharing functionality is implemented by sharing data via a DSM Master hosted on a DSM Server running inside Alice e-health app. Both Alice and the nurse then connects to the DSM Master and requests a DSM Replica, which is used by the collaborative workspace client to implement sharing so that all interactions done on the picture is synchronized between Alice and the nurse.

By using a drawing tool, the nurse marks the rash and say that is probably just a small infection and that a treatment is probably not needed. However, to be sure, she forwards the just created collaborative workspace to a doctor in a regular e-mail and promise to get back to Alice. To avoid losing the shared data when Alice close her e-health app, the DSM Master hosted on Alice DSM Server is migrated to a DSM Server running on the hospital network. The migration is completely seamless and neither Alice nor the nurse notice that the DSM Master has migrated to the hospital network.

When the doctor gets the mail, he also concludes that treatment is not needed, but writes some instructions using a Notes co-widget on the collaborative workspace on how to threat the rash. He then sends the mail back to the nurse. When the nurse gets the mail on her tablet device, she clicks on a Call-button on the collaborative workspace to call Alice. The DSM Master is migrated back to Alice e-health app to unload the DSM Server on the hospital.

This is an example of how the invention can be used to allow sharing between domains (Alice home network and the hospital network). It also an example of how DSM Master can be transferred to a DSM server on a network to better handle persistent data as well as save server capacity.

The invention claimed is:

1. A method in a client for seamlessly migrating a shared data storage from a first node to a second node, where the shared data storage is accessible to clients accessing the shared data storage during and after the migration, wherein the client comprises a first replica of the shared data storage associated with the first node to be used for operations on the shared data storage, the method comprising:
    configuring, by a migration manager in the client, a second replica of the shared data storage associated with the second node;
    configuring, by the migration manager in the client, the first and the second replicas to be used for operations simultaneously during the migration from the first node and the second node;
    configuring, by the migration manager in the client, a virtual replica encapsulating the first and second replicas internally to provide a single interface towards applications operating on the shared data storage;
    receiving information, at the migration manager in the client, that the shared data storage associated with the first node is synchronized with the shared data storage associated with the second node, wherein the synchronization comprises applying operations performed on the first and second replicas to the shared data storage associated with the first node and the shared data storage associated with the second node; and
    based on the received information, configuring, by the migration manager in the client, the first and the second replicas to only use the second replica for operations on the shared data storage.

2. The method according to claim 1, wherein each node is identified by an address and the migration manager maintains a lookup table replica mapping an address of the first node with the second node so that each client having a lookup table replica can be notified when a lookup table replica is modified, wherein each lookup table replica is associated with a lookup table master.

3. The method according to claim 1, wherein the received information, at the migration manager, that the shared data storage associated with the first node is synchronized with the shared data storage associated with the second node comprises information that the first and second replicas comprise identical information.

4. The method according to claim 1, wherein merge conflicts on the shared data storage are resolved using Operational Transformations.

5. The method according to claim 1, wherein the migration is triggered based on the load of the first node.

6. The method according to claim 1, wherein at least one of the first and second nodes is a web browser or native application runtime environment.

7. The method according to claim 1, wherein at least one of the first and second nodes is a server.

8. A method in a second node for seamlessly migrating a shared data storage from a first node to the second node, where the shared data storage is accessible to clients during and after the migration, the method comprises:
    configuring, by a migration manager in the second node, a first proxy replica of the shared data storage associated with the first node;
    configuring, by the migration manager in the second node, a second proxy replica of the shared data storage associated with the second node;
    wherein a virtual replica is configured in a client that encapsulates the first and second proxy replicas internally to provide a single interface towards applications that operates on the shared data storage;
    configuring, by the migration manager in the second node, a synchronization of the first and the second proxy replicas;
    wherein the synchronization is performed by copying data from one of the first and second proxy replicas to other of the first and second proxy replicas upon receiving an update by the one of the first and second proxy replicas regarding an operation performed by the client or the other of the first and second proxy replicas; and
    updating a lookup table replica maintained, by the migration manager in the second node, with information that the shared data storage associated with the second node can be used in addition to the shared data storage associated with the first node, wherein the lookup table replica is associated with a lookup table master which in turn is associated with lookup table replicas of other nodes and clients.

9. The method according to claim 8, wherein each node is identified by an address and the migration manager is controlling a lookup table replica mapping an address of the first node with the second node so that each client can be notified via a respective lookup table replica when the lookup table replica of the migration manager of the second node is updated.

10. The method according to claim 8, wherein merge conflicts on the shared data storage are resolved using Operational Transformations.

11. The method according to claim 10, wherein the method further comprises preventing the first and second proxy replicas from diverging by more than one state, by acquiring and releasing a lock via a shared mutex for each incoming operation, where only a proxy replica client that has acquired the shared mutex can process incoming operations.

12. The method according to claim 8, wherein at least one of the first and second nodes is a web browser or native application runtime environment.

13. The method according to claim 8, wherein at least one of the first and second nodes is a server.

14. A client of an end user device which includes a processor and a memory for seamlessly migrating a shared data storage from a first node to a second node, where the shared data storage is accessible to clients accessing the shared data storage during and after the migration, wherein the client comprises:
    a first replica of the shared data storage associated with the first node to be used for operations on the shared data storage; and
    a migration manager that:
        configures a second replica of the shared data storage associated with the second node;
        configures the first and the second replicas to be used for operations simultaneously during the migration from the first node and the second node;
        configures a virtual replica encapsulating the first and second replicas internally to provide a single interface towards applications operating on the shared data storage; and
        based on receiving information that the shared data storage associated with the first node is synchronized with the shared data storage associated with the second node, wherein the synchronization comprises applying operations performed on the first and second replicas to the shared data storage associated with the first node and the shared data storage associated with the second node, configures the first and the second replicas to only use the second replica for operations on the shared data storage.

15. The client according to claim 14, wherein the migration manager maintains a lookup table replica mapping an address of the first node with the second node, so that each client having a lookup table replica can be notified when a lookup table replica is modified, wherein each lookup table replica is configured to be associated with a lookup table master.

16. The client according to claim 14, wherein the received information that the shared data storage associated with the first node should be synchronized with the shared data storage associated with the second node comprises information that the first and second replicas comprise identical information.

17. The client according to claim 14, wherein the client is configured to resolve merge conflicts on the shared data storage using Operational Transformations.

18. The client according to claim 14, wherein the migration manager triggers the migration based on the load of the first node.

19. The client according to claim 14, wherein at least one of the first and second nodes is a web browser or native application runtime environment.

20. The client according to claim 14, wherein at least one of the first and second nodes is a server.

21. A second node for seamlessly migrating a shared data storage from a first node to the second node wherein the first node and the second node each include a processor and a memory, where the shared data storage is accessible to clients during and after the migration, wherein the second node comprises a migration manager that configures:
 a first proxy replica of the shared data storage associated with the first node,
 a second proxy replica of the shared data storage associated with the second node,
 wherein a virtual replica is configured in a client that encapsulates the first and second proxy replicas internally to provide a single interface towards applications that operates on the shared data storage,
 a synchronization of the first and the second proxy replicas,
 wherein the synchronization is performed by copying data from one of the first and second proxy replicas to other of the first and second proxy replicas upon receiving an update by the one of the first and second proxy replicas regarding an operation performed by the client or the other of the first and second proxy replicas, and
 updates a lookup table replica maintained by the migration manager with information that the shared data storage associated with the second node can be used in addition to the shared data storage associated with the first node, wherein the lookup table replica is configured to be associated with a lookup table master which in turn is configured to be associated with lookup table replicas of other nodes and clients.

22. The second node according to claim 21, wherein the migration manager controls a lookup table replica mapping the addresses of the first node with the second node so that each client can be notified via a respective lookup table replica when the lookup table replica of the migration manager of the second node is updated.

23. The second node according to claim 21, wherein the second node is configured to resolve merge conflicts on the shared data storage using Operational Transformations.

24. The second node according to claim 23, wherein the second node is configured to prevent the first and second proxy replicas to diverge more than one state by acquiring and releasing a lock via a shared mutex for each incoming operation, where only the proxy replica client that has acquired the shared mutex can process incoming operations.

25. The second node according to claim 21, wherein at least one of the first and second nodes is a web browser or native application runtime environment.

26. The second node according to claim 21, wherein at least one of the first and second nodes is a server.

* * * * *